Figure 1:
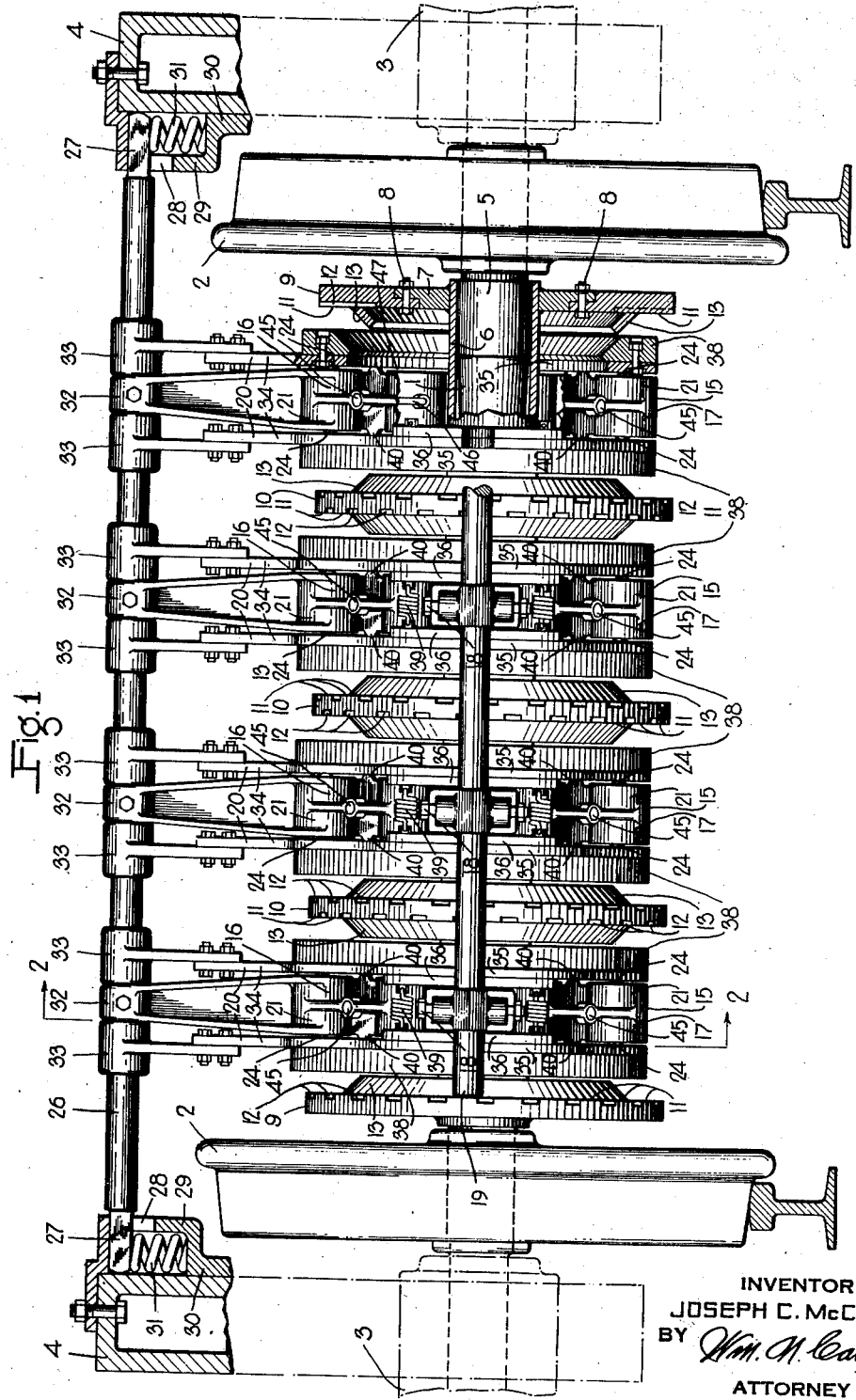

Sept. 26, 1939.　　　　J. C. McCUNE　　　　2,174,399
BRAKE MECHANISM
Original Filed Dec. 18, 1937　　2 Sheets-Sheet 1

INVENTOR
JOSEPH C. McCUNE
BY Wm. N. Cady
ATTORNEY

Sept. 26, 1939.   J. C. McCUNE   2,174,399
BRAKE MECHANISM
Original Filed Dec. 18, 1937   2 Sheets-Sheet 2
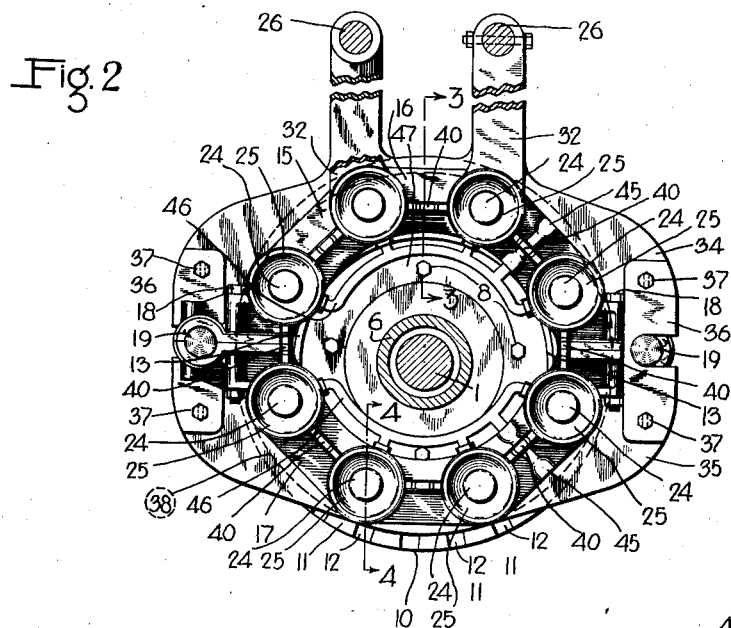
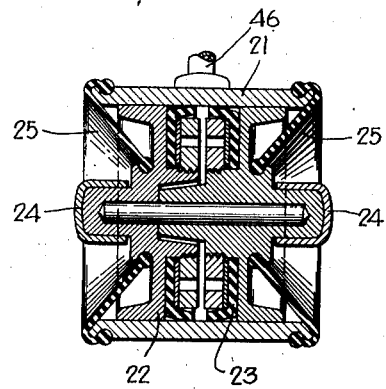
INVENTOR
JOSEPH C. McCUNE
BY *Wm. M. Cady*
ATTORNEY Patented Sept. 26, 1939

2,174,399

UNITED STATES PATENT OFFICE 2,174,399

BRAKE MECHANISM

Joseph C. McCune, Edgewood, Pa., assignor to The Westinghouse Air Brake Company, Wilmerding, Pa., a corporation of Pennsylvania Application December 18, 1937, Serial No. 180,608
Renewed July 28, 1939

21 Claims. (Cl. 188—59)

This invention relates to friction disk brake mechanism for railway vehicle wheel and axle assemblies and more particularly to a friction disk brake mechanism of the unit type adapted to be employed on any one or all of a plurality of wheel and axle assemblies of the railway vehicle.

It has heretofore been proposed to mount each unit brake mechanism as a whole on the axle of a wheel and axle assembly of a railway vehicle truck. In this arrangement the wheel and axle assembly is subjected to the dead or unsprung weight of the mechanism which, in some instances, may be deemed undesirable.

The principal object of the present invention is to provide an improved disk brake mechanism for a wheel and axle assembly of a railway vehicle truck which mechanism is so constructed and arranged that the major portion of the weight thereof will be carried by the truck frame instead of directly by the wheel and axle assembly.

According to this object the rotatable brake elements of the mechanism are carried by the axle of the wheel and axle assembly and the non-rotatable brake elements, brake cylinder devices for moving the non-rotatable brake elements into frictional braking engagement with the rotatable brake elements, and the supporting structure for the non-rotatable brake elements and the brake cylinder devices are carried directly by the truck frame which is spring supported from the wheel and axle assembly.

It will be apparent that with the truck frame thus yieldable supported from the axle of the wheel and axle assembly, both the truck frame and the brake parts which are carried by the frame will move downwardly relative to the axle when the vehicle is being loaded and also when the journal bearings for the axle wear, and will move upwardly relative to the axle when the vehicle is being unloaded. When the vehicle is in transit the truck frame will vibrate or vacillate vertically relative to the wheel and axle assembly under the usual service conditions to which the vehicle is subjected. From this it will readily be understood that when, due to any of the above enumerated causes, the truck frame is caused to move vertically relative to the wheel and axle assembly, the several parts of the mechanism which are carried by the truck frame will assume an eccentric relationship to the axle and the rotatable brake elements carried by the axle. If these brake elements were permitted to remain in this position when they are caused to frictionally engage with the rotatable brake elements to retard or stop the rotation on the wheel and axle assembly, unbalanced torque forces would be set up in the supporting structure for the non-rotatable brake elements and consequently in the truck frame which could not be successfully counteracted without an excessive increase in the weight of the supporting structure and in the truck frame. Another objectionable feature is that for every position to which the non-rotatable brake elements are moved a different portion of each element will be engaged by the corresponding rotatable brake element which will, in a short time, cause uneven wear of the non-rotatable elements, and as a result of such wear will, of course, produce unreliable as well as insufficient braking action on the assembly.

With the foregoing in mind it is another object of the invention to provide means whereby the non-rotatable brake elements of the mechanism are caused to move relative to the truck frame into concentric relationship with the axle and rotatable brake elements just prior to the braking faces of the non-rotatable brake elements being brought into frictional braking engagement with the braking faces of the rotatable brake elements.

According to this object the rotatable brake elements are secured to the axle so as to rotate therewith and the non-rotatable brake elements as well as the mechanism for moving them into frictional braking engagement with the rotatable brake elements are carried by the truck frame in such a manner as to be movable downwardly relative to the truck frame. The rotatable brake elements are each provided on each side with a circular cone shaped projection which is adapted to cooperate with the inner surface of a central opening provided in the adjacent non-rotatable brake element for the reception of the projection, which inner surface is preferably shaped to conform to that of the projection. This projection, as will hereinafter more fully appear, is adapted to be engaged by the inner surface of the non-rotatable brake element as the element is moved toward its braking position, and when in such engagement causes the non-rotatable element to be moved downwardly relative to the truck frame into concentric relationship with the rotatable element. At substantially the same time as this occurs or just following, the non-rotatable element is brought into frictional braking engagement with the rotatable brake element, thus eliminating the above mentioned objectionable features which are present when the non-rotatable elements are permitted to assume an off-center position with relation to the axle and rotatable brake element.

Other objects and advantages will appear in the following more detailed description of the invention.

In the drawings Fig. 1 is an end elevational view of a railway vehicle truck embodying the invention; Fig. 2 is a sectional view taken on the line 2—2 of Fig. 1, the wheels of the wheel and axle assembly and the truck frame being omitted; Fig. 3 is a sectional view of the rotatable and non-rotatable brake elements taken longitudinally of the mechanism on the line 3—3 of Fig. 2; and Fig. 4 is an enlarged sectional view of one of the brake cylinders taken on the line 4—4 of Fig. 2.

In the accompanying drawings the brake mechanism is shown in conjunction with a wheel and axle assembly and the truck frame of a railway vehicle truck. The wheel and axle assembly may comprise an axle 1 having secured thereto adjacent each end a wheel 2. Each end of the axle is journaled in a journal box 3 which may be mounted in the usual manner in the truck frame, which truck frame is spring supported from the journal boxes in the usual manner. The truck frame may be of any desired construction, but for illustrative purposes only is shown as being of the cast metal type having spaced side frames 4 which may be integrally connected together by the usual transversely extending end pieces and transoms. These end pieces and transoms form no part of the present invention and for this reason and for the purpose of more clearly illustrating the invention they have been omitted from the drawings.

Adjacent each wheel, the axle 1 is provided with an enlarged portion 5 on which there is mounted the adjacent end of a tubular member 6 which is disposed between the wheels 2 and which extends longitudinally of and encircles the axle, the member being secured to the portions 5 so as to rotate with the axle. In the present embodiment of the invention, the member is preferably shrunk on the portions 5 but may be secured thereto in any other desired manner.

Evenly spaced longitudinally of the member 6 and rigidly attached thereto in any desired manner so as to rotate therewith are five annular flanges 7 which extend radially outwardly from the member at right angles to the axis of the axle 1.

Removably secured to each of the end flanges 7 by means of bolts 8 and extending radially outwardly from the peripheral edge of the flange is an annular brake element 9 which is preferably made of two segmental pieces which are arranged in end-to-end relation to each other to form an annulus. Removably secured in like manner to each of the other flanges 7 and extending radially outwardly from the peripheral edge of the flange is an annular brake element 10 which, like the element 9, is preferably made of two segmental pieces arranged to form an annulus.

Each of the brake elements 9 is provided on one side with an annular friction braking surface which is divided into a plurality of braking surfaces 11 by radially arranged narrow grooves 12 which extend across the braking face and which are open at their outer ends to the atmosphere and at their inner ends are connected to an opening which extends through the face portion of a guide flange or projection 13 having an outer guide surface in the form of a truncated cone, which opening is in direct open communication with the space between the inner face of the flange and the member 6. The projection 13 is preferably integral with the element 9 and is centralized with relation to the axis of the axle 1.

The brake elements 10 differ from the elements 9 in that they are each provided on each side with grooves 12 and a projection 13, the grooves on one side of the element being arranged in staggered relationship to the corresponding grooves on the opposite side. It should here be mentioned that if it is desired to have all of the non-rotatable brake elements the same an element 10 may be substituted for each element 9.

Arranged between each two rotatable brake elements is a substantially annular brake cylinder device 15, which surrounds the axle 1, there being four of said devices included in the present embodiment of the invention.

Each of these brake cylinder devices may comprise upper and lower segmental members 16 and 17, respectively, which are arranged in end-to-end relationship to each other to form an annulus, and which at their meeting ends, on each side of the axle 1 are removably clamped together by means of a bolt 18. On each side of the axle 1 and extending longitudinally thereof is a bar 19 which is clamped in place by the end of the brake cylinder members 16 and 17. These bars serve to assist in maintaining the brake cylinder devices against movement relative to each other in directions longitudinally of the axle 1 and also serve to assist in supporting non-rotatable braking elements 20 which are hereinafter more fully described.

In the present embodiment of the invention each brake cylinder member 16 and 17 comprises four radially arranged circular brake cylinder casings 21 of relatively small diameter which are integrally connected together. These casings are open to both sides of the brake cylinder device and are so arranged that their axes are parallel with the axis of the axle 1.

Contained in each brake cylinder casing are two circular pistons 22 and 23 which are disposed face to face and which are movable in opposite directions to each other in either effecting an application or the release of the brakes. Each piston is provided with a stem 24 which is adapted to operatively engage one of the non-rotatable brake elements 20 as will hereinafter more fully appear. To prevent dirt and moisture from entering the cylinder casing a flexible boot 25 is provided at each end thereof which, as shown in Fig. 4 is secured to the casing and to the adjacent piston. Located on each side of and above the axle 1 and extending transversely of the truck parallel with the axis of the axle are spaced support members 26 which, in the present embodiment of the invention, are in the form of bars having squared ends 27 which slidably fit in grooves 28 provided in flanges 29 of brackets 30 which are rigidly secured to the side frames of the truck, the flanges and squared ends of the bars cooperating to prevent the rotation of the members about their axes. Between each flange 29 and the adjacent side frame the adjacent end of each bar is supported by a spring 31 which is carried by the corresponding bracket 30.

Each of the upper segmental members 16 of the brake cylinder devices is provided with spaced outwardly extending hangers 32 which engage the yieldably mounted supports 26. It will here be noted that the brake cylinder devices are yieldably supported from the truck frame by the support 26, spring 31 and bracket 30 and that the supports, since they are spaced longitudinally of the truck, will prevent any pendulum action of the brake cylinder devices relative to the axle and rotatable brake elements.

Arranged between each side of each brake cylinder device 15 and the adjacent rotatable brake element and encircling the axle 1 is a non-rotatable brake element 20 which is movable in directions longitudinally of the axle and which is rigidly secured to a bracket 33 slidably mounted on the yieldably mounted supports 26. This element is also slidably carried on the bars 19 as shown in Fig. 2. Each non-rotatable element may comprise upper and lower vertically aligned flat plates 34 and 35, respectively, which extend transversely of the axle and parallel with the elements 9 and 10 secured to the axle.

Adjacent each bar 19 the plates 34 and 35 of each element 20 are secured together by means of an overlapping flat plate 36 and bolts 37.

Secured to one side of each non-rotatable plate by countersunk bolts or any other desired means is a semi-circular friction plate or brake shoe 38 which has a friction face for engagement with the friction faces 11 of an adjacent rotatable brake element. When the plates 34 and 35 are secured together in the manner just described, the brake shoes 38 secured to the plates form an annulus of substantially the same diameter as the rotatable brake elements. The inner surface of the brake shoe which defines the central opening in the non-rotatable member is shaped to conform to the shape of the outer surface of the projection 13 of adjacent rotatable brake elements 9 and 10.

Extending between and secured to the non-rotatable brake elements which are arranged one on each side of each brake cylinder device by means of the bolts 37 are release springs 39 which normally maintain the non-rotatable brake elements in their release position, in which position these brake elements engage stops 40 which are formed integral with the brake cylinder devices at points located between each two brake cylinder casings.

It should here be mentioned that when the vehicle is empty the brake cylinder devices and non-rotatable brake elements will be positioned eccentrically with relation to the rotatable brake elements and axle 1 as shown, the degree of eccentricity being such that when the vehicle is fully loaded the downward movement of the truck frame relative to the wheel and axle assembly will not be sufficient to bring the brake cylinder devices and non-rotatable brake elements into concentric relationship with the rotatable elements. As will hereinafter more fully appear this is done for the purpose of insuring the proper concentric relationship between the several above mentioned parts of the mechanism when the non-rotatable brake elements are being moved toward the rotatable brake elements for braking engagement therewith.

In operation, when it is desired to effect an application of the brakes, fluid under pressure is admitted through passages 45 and pipe 46 to the faces of the piston of each brake cylinder causing the pistons to move outwardly in opposite directions. Each piston as it is thus moved acts through the medium of its stem 24 to move the adjacent non-rotatable element toward the adjacent rotatable element. When, due to this movement, the surface of the non-rotatable element engages the outer surface of the projection 13 on the rotatable element and movement of the non-rotatable element continues, the interengaging surfaces cooperate to move the non-rotatable elements and supports 26 downwardly relatively to both the axle and the truck frame against the opposing action of the springs 31 acting on the supports. Since the brake cylinder devices are carried by the supports 26 they will move downwardly with the non-rotatable elements. At substantially the same time as the non-rotatable brake elements are caused to move into concentric relationship with the rotatable brake elements, the friction braking surfaces of the rotatable and non-rotatable brake elements interengage to retard or stop the rotation of the wheel and axle assembly.

It will here be noted that when the non-rotatable and rotatable brake elements are in frictional braking engagement with each other that each brake cylinder device, the two adjacent non-rotatable brake elements, the corresponding rotatable brake elements and the flanges 6 to which the rotatable brake elements are secured define a chamber 47 which is open to the atmosphere by way of the spaces between the sides of the brake cylinder device and the non-rotatable brake elements and also by way of the grooves 12 in the rotatable elements.

Each rotatable brake element, due to the grooves 12 in its friction face or faces acts, when the element is rotating, as a fan to draw air from the chamber 47 and pass it across both the rotatable brake element and the adjacent non-rotatable brake element to the atmosphere, the air as it flows through the grooves 12 contacting the friction face of the non-rotatable elements and contacting the bottom and side walls of the grooves. As the air is thus drawn from the chamber, air from the exterior of the mechanism flows to the chamber by way of the spaces between the non-rotatable brake elements and the brake cylinder device, the air current contacting the rear surfaces of these elements and the sides of the brake cylinder device, the boot 25 and the brake cylinder pistons 24. Air passing through the grooves 12 will dissipate considerable heat produced in the brake elements by friction and the air passing between the brake cylinder device and the non-rotatable brake elements will assist in dissipating heat from the elements and heat which may be transmitted from the non-rotatable elements to the piston stems. It will here be understood that the current of air passing between each non-rotatable brake element and the adjacent side of the brake cylinder device will effectively carry away heat radiated from the element, thus guarding the boots 25 against damage due to heat. From the foregoing it will be seen that the several parts of the brake mechanism will be maintained comparatively cool.

While the friction faces of the non-rotatable and rotatable brake elements are in frictional engagement with each other, minute particles of metal worn away from the friction surfaces, will work their way from between these surfaces and be deposited into the grooves 12 of the rotatable brake elements and will be discharged therefrom by either centrifugal force or by the force of the air current passing through the grooves. If the rotary speed of the rotatable brake elements is too low to discharge the particles in this manner they will be discharged by the force of gravity as the grooves move across the top or bottom of the mechanism, the particles thus discharged from the grooves 12 at the top of the mechanism fall through the chamber 47 and through the grooves 12 at the bottom of the mechanism to the exterior thereof. From this it will be seen that during a brake application, the friction faces of both the rotatable and non-rotatable brake elements are maintained substantially free of minute particles of metal worn from the faces, thus the friction characteristics of the brake elements are maintained substantially constant or uniform.

When it is desired to effect the release of the brakes fluid under pressure is vented from the piston chambers of the brake cylinders by way of the pipe 46 and passages 45, and as this is done the release springs 39 act to move the non-rotatable brake elements toward each other and out of braking engagement with the rotatable brake elements, the non-rotatable elements being brought to a stop in their normal release positions by the stops 40. The non-rotatable brake elements as they are thus moved force the pistons 22 and 23 to their normal release positions as shown in Fig. 4. As the non-rotatable elements are being moved out of frictional braking engagement with the rotatable elements the springs 31 acting through the medium of the supports 26 cause the non-rotatable brake elements and brake cylinder devices to move upwardly relative to the rotatable brake elements to their normal positions as shown in Figs. 1, 2 and 3. It will here be understood that when the truck frame assumes its full load position relative to the wheel and axle assembly the non-rotatable brake elements and brake cylinders will, of course, be positioned closer to the axle than is shown in the drawings but these parts will be slightly eccentric with relation to the rotatable brake elements, so that when an application of the brakes is being effected the concentricity of all of the brake elements and brake cylinders will be insured.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake, in combination, a wheel and axle assembly, a truck frame supported from said assembly and being movable vertically relative to the assembly, rotatable and non-rotatable circular brake elements adapted to frictionally interengage when in concentric relationship with each other for retarding the rotary motion of the assembly, the rotatable element being carried by the axle of the assembly for rotation therewith, and the non-rotatable brake element being adjustably carried by the truck frame for movement relative to the truck frame into concentric relationship with the rotatable brake element, means for effecting the frictional braking engagement of the braking elements, and means for insuring the concentricity of the braking elements at the time they frictionally interengage.

2. In a vehicle frame, in combination, a wheel and axle assembly, a truck frame supported from said assembly and being movable vertically relative to the assembly, rotatable and non-rotatable circular brake elements having braking surfaces adapted to frictionally interengage when in concentric relationship with each other for retarding the rotary motion of the assembly, the rotatable element being carried by the assembly for rotation therewith, and the non-rotatable brake element being adjustably carried by the truck frame for movement relative to the truck frame into concentric relationship with the rotatable brake element, means for effecting the frictional braking engagement of the braking surfaces, and means operative prior to the frictional braking interengagement of said surfaces for effecting the movement of the non-rotatable element into concentric relationship with said rotatable element.

3. In a vehicle brake, in combination, a wheel and axle assembly, a truck frame supported from said assembly and being movable vertically relative to the assembly, rotatable and non-rotatable circular brake elements having braking surfaces adapted to frictionally interengage when in concentric relationship with each other for retarding the rotary motion of the assembly, the rotatable element being carried by the assembly for rotation therewith, and the non-rotatable brake element being adjustably carried by the truck frame for movement relative to the truck frame into concentric relationship with the rotatable brake element, means for effecting the frictional braking engagement of the braking surfaces, and wedge means operative prior to the frictional braking interengagement of said surfaces for effecting the movement of the non-rotatable element into concentric relationship with said rotatable element.

4. In a vehicle brake, in combination, a wheel and axle assembly, a truck frame supported from said assembly and being movable vertically relative to the assembly, rotatable and non-rotatable circular brake elements having braking surfaces adapted to frictionally interengage when in concentric relationship with each other for retarding the rotary motion of the assembly, the rotatable element being carried by the axle of the assembly for rotation therewith, and the non-rotatable brake element being adjustably carried by the truck frame for movement relative to the truck frame into concentric relationship with the rotatable brake element, means for effecting the frictional braking engagement of the braking surfaces, and wedge means on said non-rotatable brake element adapted to cooperate with said rotatable element for insuring the concentricity of the surfaces at the time the elements frictionally interengage.

5. In a vehicle brake, in combination, a wheel and axle assembly, a truck frame supported from said assembly and movable vertically relative to the assembly, rotatable and non-rotatable brake elements having annular braking surfaces adapted when concentric with each other to frictionally interengage to produce braking action, said rotatable element being carried by the axle of said assembly for transmitting the braking action to the assembly, and said non-rotatable element being so arranged and carried by the truck as to move vertically with the truck frame and to also move vertically relative to the truck frame, and means on said rotatable brake element adapted to cooperate with the non-rotatable brake element to insure the concentric relationship between said braking surfaces at the time they frictionally interengage to produce braking action.

6. In a vehicle brake, in combination, a wheel and axle assembly, a truck frame supported by said assembly and movable vertically relative to the assembly, a brake element carried by the axle of said assembly and rotatable therewith, a non-rotatable brake element surrounding said axle and carried by said truck frame, said non-rotatable brake element being arranged eccentrically with relation to said rotatable brake element and being movable into braking engagement with said rotatable brake element, actuating means carried by the truck frame for moving the non-rotatable braking element into braking engagement with the rotatable braking element, and means operative to move the non-rotatable brake element and said actuating means into concentric relationship with the rotatable brake element as the non-rotatable brake element is being moved toward its braking position.

7. In a vehicle brake, in combination, a wheel and axle assembly, a truck frame supported by said assembly and movable vertically relative to the assembly, a brake element carried by the axle of said assembly and rotatable therewith, a non-rotatable brake element surrounding said axle and carried by said truck frame, said non-rotatable brake element being arranged eccentrically with relation to said rotatable brake element and being movable into braking engagement with said rotatable brake element, means carried by the truck frame for moving the non-rotatable braking element into braking engagement with the rotatable braking element, and wedge means operative to move the non-rotatable brake element into concentric relationship with said rotatable brake element at substantially the same time as the non-rotatable element is moved into braking engagement with the rotatable brake element.

8. In a vehicle brake, in combination, a wheel and axle assembly, a truck frame supported by said assembly and movable vertically relative thereto, a non-rotatable brake element carried by the truck frame movable vertically therewith and also relative thereto, said brake element encircling the axle of said assembly and being arranged eccentrically of the axle, a rotatable brake element arranged concentrically of the axle and secured thereto for rotation therewith, means carried by the truck frame operative to move the non-rotatable brake element into frictional braking engagement with said rotatable element, and means for moving said non-rotatable element relative to the truck frame into concentric relationship with said axle and thereby with said rotatable element when the non-rotatable element is being moved toward its frictional braking position.

9. In a vehicle brake, in combination, a wheel and axle assembly, a truck frame supported by said assembly and movable vertically relative thereto, a non-rotatable brake element carried by the truck frame movable vertically therewith and also relative thereto, said brake element encircling the axle of said assembly and being arranged eccentrically of the axle, a rotatable brake element arranged concentrically of the axle and secured thereto for rotation therewith, means carried by the truck frame operative to move the non-rotatable brake element into frictional braking engagement with said rotatable element, said means encircling the axle and being movable vertically with and also relative to the truck frame, and means operative upon movement of the non-rotatable element toward its frictional braking position for effective movement of the non-rotatable element and the element actuating means into concentric relationship with the axle and thereby with the rotatable element.

10. In a vehicle brake, in combination, a wheel and axle assembly, a truck frame supported by said assembly and movable vertically relative thereto, a non-rotatable brake element carried by the truck frame movable vertically therewith and also relative thereto, said brake element encircling the axle of said assembly and being arranged eccentrically of the axle, a rotatable brake element arranged concentrically of the axle and secured thereto for rotation therewith, means carried by the truck frame operative to move the non-rotatable brake element into frictional braking engagement with said rotatable element, said means encircling the axle and being movable vertically with and also relative to the truck frame, means operative upon movement of the non-rotatable element toward its frictional braking position for effecting movement of the non-rotatable element and the element actuating means into concentric relationship with the axle and thereby with the rotatable element, and spring means operative upon movement of the non-rotatable element out of frictional braking engagement with the rotatable element for moving the non-rotatable element and the element actuating means to their normal position with relation to the truck frame.

11. In a vehicle brake, in combination, a wheel and axle assembly, a truck frame supported by said assembly and movable vertically relative thereto a limited distance, a brake element carried by and encircling the axle of said assembly and rotatable therewith, a non-rotatable brake element carried by said truck frame movable into frictional braking engagement with the rotatable brake element, said non-rotatable brake element being arranged eccentrically of the axle a distance equal at least to the distance the truck frame is adapted to move relative to the axle, and means operative upon movement of the non-rotatable element toward its frictional braking position for moving it into concentric relationship with said axle.

12. In a vehicle brake, in combination, a wheel and axle assembly, a truck frame supported by said assembly and movable vertically relative thereto a limited distance, a brake element carried by and encircling the axle of said assembly and rotatable therewith, a yieldable support mounted on said truck frame, a non-rotatable brake element carried by said support and movable into frictional braking engagement with the rotatable brake element, said non-rotatable brake element encircling the axle and being arranged eccentrically thereof, means for actuating said non-rotatable brake element, said means being carried by said support and being maintained against movement relative to the support, and means on said rotatable element adapted to cooperate with the non-rotatable element when the non-rotatable element is moved toward its frictional engaging position to centralize the non-rotatable element with the rotatable element, said non-rotatable element as it is thus being centralized acting to move said support relative to the truck frame for maintaining the actuating means for the non-rotatable element centralized with the non-rotatable element.

13. In a vehicle brake, in combination, a wheel and axle assembly, a truck frame supported by said assembly and movable vertically relative thereto a limited distance, a brake element carried by and encircling the axle of said assembly and rotatable therewith, a non-rotatable brake element carried by said truck frame movable into frictional braking engagement with the rotatable brake element, said non-rotatable brake element with the vehicle empty being arranged eccentrically of the axle a distance equal at least to the distance the truck frame is adapted to move relative to the axle, and means operative upon movement of the non-rotatable element toward its frictional braking position for moving it into concentric relationship with said axle.

14. In a vehicle brake, in combination, a wheel and axle assembly, a truck frame supported by said assembly and movable vertically relative thereto a limited distance, a brake element carried by and encircling the axle of said assembly and rotatable therewith, a non-rotatable brake element carried by said truck frame movable into frictional braking engagement with the rotatable brake element, said non-rotatable brake element being at all times biased toward a position eccentric to the axis of said axle, and means operative upon movement of the non-rotatable element toward its frictional braking position for moving it into concentric relationship with said axle.

15. In a vehicle brake, in combination, a wheel and axle assembly, a truck frame supported by said assembly and movable vertically relative thereto a limited distance, a brake element carried by and encircling the axle of said assembly and rotatable therewith, a non-rotatable brake element carried by said truck frame movable into frictional braking engagement with the rotatable brake element, said non-rotatable brake element with the vehicle either empty or under load being eccentric with the rotatable element, and means operative upon movement of the non-rotatable element toward its frictional braking position for causing it to move into concentric relationship with the rotatable element.

16. In a vehicle brake, in combination, a wheel and axle assembly, a truck frame supported from said assembly and being movable vertically relative to the assembly, rotatable and non-rotatable brake elements having annular vertically disposed portions adapted to frictionally interengage when in concentric relationship with each other for opposing rotary motion of the assembly and having portions disposed at an angle to said vertically disposed portions adapted to interengage to insure the concentric relationship between said elements, the rotatable member being carried by the wheel and axle assembly for rotation therewith and the non-rotatable element being carried by the truck frame and movable vertically therewith relative to said assembly, and means operative to effect the frictional braking engagement of the vertically disposed portions of said elements, the angularly disposed portions of said elements being adapted to interengage prior to the interengagement of the vertically disposed portions of the elements in the event of the elements being in eccentric relationship with each other.

17. In a vehicle brake, in combination, a wheel and axle assembly, a truck frame supported from said assembly and being movable vertically relative to the assembly, rotatable and non-rotatable brake elements having annular vertically disposed portions adapted to frictionally interengage when in concentric relationship with each other for opposing rotary motion of the assembly and having portions disposed at an angle to said vertically disposed portions adapted to interengage to insure the concentric relationship between said elements, the rotatable member being carried by the wheel and axle assembly for rotation therewith and the non-rotatable element being carried by the truck frame and movable vertically therewith relative to said assembly, means operative to effect the frictional braking engagement of the vertically disposed portions of said elements, the angularly disposed portions of said elements being adapted to interengage prior to the interengagement of the vertically disposed portions of the elements in the event of the elements being in eccentric relationship with each other, and means embodied in the vertically disposed portion of said rotatable member for conducting air through the angularly disposed portion of the rotatable member and across the face of the vertically disposed portion of the non-rotatable brake element.

18. A circular brake element for a friction disc brake mechanism of the type having a brake shoe for frictional braking engagement with said element which brake shoe may be supported eccentrically with relation to the annular brake element, said brake element comprising an annular braking portion adapted to cooperate with said brake shoe to effect braking and also comprising a centering portion extending at an angle to said braking portion and adapted to cooperate with said brake shoe to effect movement of the shoe into concentric relationship with the element.

19. A circular brake element for a friction disc brake mechanism of the type having a brake shoe for frictional braking engagement with said element which brake shoe may be supported eccentrically with relation to the annular brake element, said brake element comprising an annular braking portion adapted to cooperate with said brake shoe to effect braking and also comprising a frustro-conical centering portion extending outwardly from said braking portion and adapted to cooperate with a complementary centering portion of the brake shoe for centering the brake shoe with relation to the element.

20. A circular brake element for a friction disc brake mechanism of the type having a brake shoe for frictional braking engagement with said element which brake shoe may be supported eccentrically with relation to the annular brake element, said brake element comprising an annular braking portion adapted to cooperate with said brake shoe to effect braking and also comprising a frustro-conical centering portion extending outwardly from said braking portion and adapted to cooperate with a complementary centering portion of the brake shoe for centering the brake shoe with relation to the element and radially arranged air ducts passing through said frustro-conical centering portion and across the annular braking portion.

21. In a vehicle brake, in combination, a wheel and axle assembly, a truck frame yieldably supported from said assembly for vertical movement relative to the truck frame, rotatable and non-rotatable brake elements encircling the axle of said assembly and adapted to frictionally interengage for retarding rotary motion of the assembly, the rotatable brake element being carried by said axle and rotatable therewith and the non-rotatable brake element being carried by the truck frame and movable with the truck frame relative to the assembly, means rendering the non-rotatable brake element movable vertically relative to said truck frame and to said assembly, means operative for effecting the frictional braking interengagement of said elements, and means on said elements and separate from the braking faces of the element adapted to cooperate to move said non-rotatable brake element vertically relative to the truck frame into axial alignment with said rotatable element upon the initial operation of the second mentioned means and before the friction braking faces contact each other.

JOSEPH C. McCUNE.

CERTIFICATE OF CORRECTION.

Patent No. 2,174,399. September 26, 1939.

JOSEPH C. McCUNE.

It is hereby certified that error appears in the printed specification of the above numbered patent requiring correction as follows: Page 4, first column, line 54, claim 2, for the word "frame" read brake; and that the said Letters Patent should be read with this correction therein that the same may conform to the record of the case in the Patent Office.

Signed and sealed this 26th day of December, A. D. 1939.

(Seal)

Henry Van Arsdale,
Acting Commissioner of Patents.